UNITED STATES PATENT OFFICE.

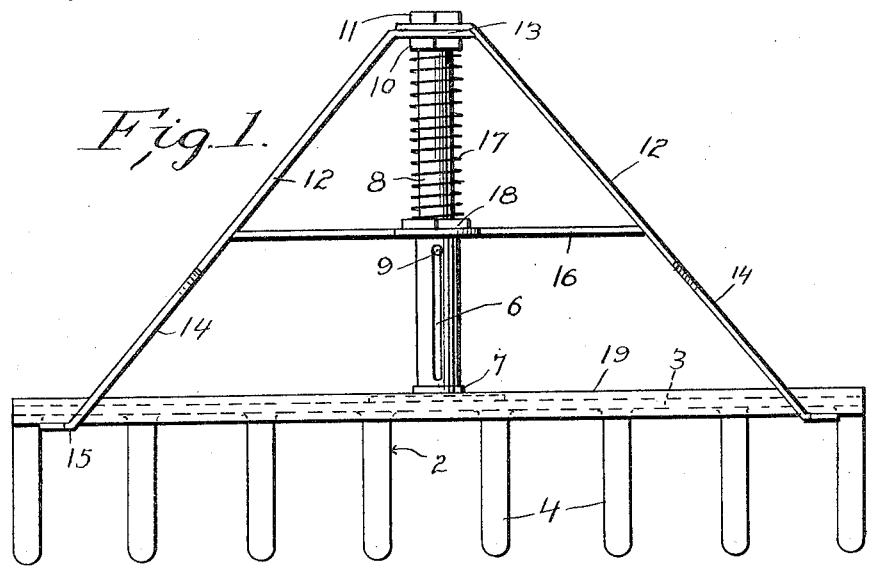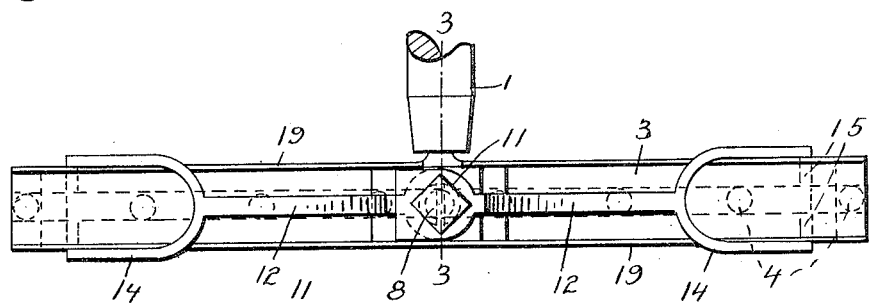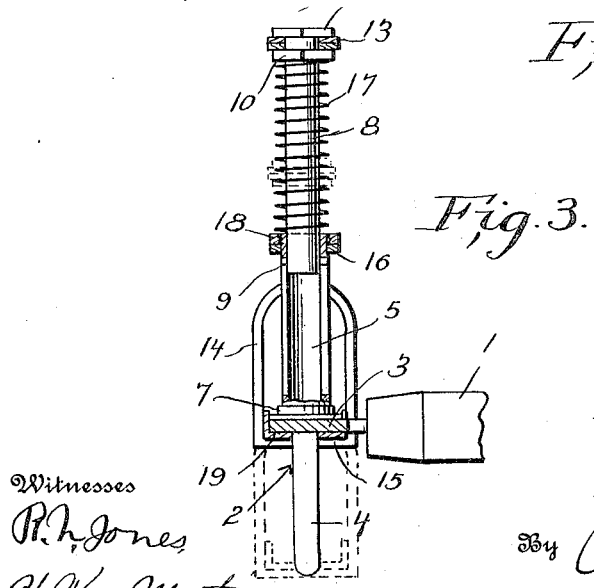

FRANK B. BOOSVELD, OF LYNCHBURG, OHIO.

RAKE-CLEANER.

1,092,011.

Specification of Letters Patent.  Patented Mar. 31, 1914.

Application filed June 2, 1913. Serial No. 771,280.

*To all whom it may concern:*

Be it known that I, FRANK B. BOOSVELD, a citizen of the United States, residing at Lynchburg, in the county of Highland and State of Ohio, have invented certain new and useful Improvements in Rake-Cleaners; and I do hereby declare the following to be a full, clear, and exact description of the invention, such as will enable others skilled in the art to which it appertains to make and use the same.

This invention relates to new and useful improvements in rake cleaners and has for its principal object to provide a device which may be easily and quickly attached to the ordinary type of rake without in any way changing the construction of the same.

Another object of my invention is to provide a device which may be operated by turning the rake over and pressing the same downwardly.

A still further object of my invention is to simplify the construction and operation of such devices and render them effective in use and cheap to manufacture.

With the above and other objects in view I now proceed to describe my invention in the following specification and accompanying drawings, in which:

Figure 1 is a view in elevation of my improved rake cleaner as it would appear when applied to a rake, Fig. 2 is a top plan view of Fig. 1, and Fig. 3 is a detail sectional view of my improved rake cleaner taken on line 3—3 of Fig. 1.

Referring more particularly to the drawings 1 indicates a handle of a rake of the usual construction having secured to one end thereof the usual rake head, indicated generally by the numeral 2, which preferably comprises the transversely extending bar 3, having secured thereto and depending therefrom the usual rake teeth 4.

My improved cleaning device preferably comprises the upstanding tubular member 5 which is secured intermediate the ends of the rake head and extends in an opposite direction to the teeth. This tubular member is provided with a longitudinally extending slot 6 and has secured to the lower end the outstanding collar 7. A cylindrical member 8 having the pin 9 extending through an aperture adjacent its lower extremity is slidably mounted in the tubular member 5, the upper extremity of the cylindrical member 8 is preferably provided with screw threads, which are adapted to receive the nuts 10 and 11 between which the upper ends of the operating bars are adapted to be clamped. These operating bars, indicated by the numeral 12, are provided at their upper extremities with the angularly extending portions 13 which are adapted to lie between the nuts 10 and 11 and be firmly clamped therein. The ends opposite the angularly extending portions are extended as clearly illustrated in Fig. 2 and provided with the U-shaped members 14, having their arms bent inwardly, as clearly illustrated at 15, and adapted to be secured to the angle-irons forming the stripping plates. A transversely extending bar 16 is secured to the operating bars 12 intermediate their ends and is provided with an aperture intermediate its ends through which the tubular member 5 is adapted to extend, as is clearly illustrated in Fig. 1, this bar 10 being adapted to form a brace between the operating bars 12 and hold the same in their respective positions. A suitable coil spring 17 is interposed between the nut 10 and a suitable bearing plate 18, which is secured to the upper extremity of the tubular member 5 and is adapted to hold the spring in position.

The stripping plates of my improved rake cleaner preferably comprise the angle-irons 19, which are secured to the angular extensions 15 formed at the ends of the arms of the U-shaped members.

It will be seen from the foregoing that when it is desired to make use of my improved rake cleaner the only operation necessary is the inverting of the rake and applying pressure thereon. The resulting action will cause the cylindrical member 8 to slide upwardly through the tubular member 5 which in turn will cause the operating bars 12 to slide with relation to the rake head and it will be obvious that the stripping plates 19 would cause trash or other matter gathered on the rake teeth to be forced toward the ends, upon releasing of the pressure the spring 17 will cause the stripping plates to return to their normal position and the rake will again be in condition for use.

While in the foregoing I have shown and described the preferred embodiment of my invention, I wish it to be understood that I may change the specific arrangements of parts without in any way departing from the spirit and scope of my invention.

What I claim is:—

1. In combination with a rake, a cleaner comprising stripping plates, operating bars, U-shaped members formed integrally with the operating bars and secured to the stripping plates, a tubular member extending upwardly from the rake head, a cylindrical member slidably mounted within the tubular member, means connecting the upper extremities of the operating bars with the cylindrical member, and a spring interposed between the upper extremity of the cylindrical member and the upper extremity of the tubular member, said spring being adapted to exert pressure thereagainst and force the cylindrical member upwardly.

2. In combination with a rake, a cleaner comprising stripping plates, operating bars, U-shaped members formed integrally with said operating bars and connected with the stripping plates, a tubular member secured to the rake head intermediate its ends, a cylindrical member slidable with relation to the tubular member, angular extensions formed at the upper extremities of the operating bars, nuts carried by the upper end of the cylindrical member, said angular extensions being adapted to be clamped between the nuts, a transversely extending bar secured intermediate the operating bars, and a spring surrounding the cylindrical member and adapted to exert upward pressure thereagainst, thereby holding said cylindrical member in its upward position.

3. In combination with a rake, a cleaner comprising stripping plates, operating bars, U-shaped members formed at the ends of the operating bars and secured to the stripping plates, angular extensions formed at the upper extremities of the operating bars, a tubular member having longitudinal slots therein, a cylindrical member slidable in said tubular member, a pin extending through an aperture in the cylindrical member, the ends of said pin being adapted to enter the slots, screw threads formed at the upper extremity of the cylindrical member, internally screw threaded nuts adapted to coöperate with the screw threads on the cylindrical member and firmly clamp the angularly extending portions formed on the operating bars and means for holding the stripping plates in their upward position.

In testimony whereof I affix my signature in presence of two witnesses.

FRANK B. BOOSVELD.

Witnesses:
G. L. BERING,
Jos. C. KELLEY.

Copies of this patent may be obtained for five cents each, by addressing the "Commissioner of Patents, Washington, D. C."